(12) United States Patent
Bazzo

(10) Patent No.: US 9,962,874 B2
(45) Date of Patent: May 8, 2018

(54) INJECTOR FOR PLASTIC MATERIAL INJECTION MOLDING APPARATUS

(71) Applicant: INGLASS S.p.A., San Polo di Piave (Treviso) (IT)

(72) Inventor: Maurizio Bazzo, San Polo di Piave (Treviso) (IT)

(73) Assignee: INGLASS S.p.A., San Polo di Piave (Treviso) (IT)

( * ) Notice: Subject to any disclaimer, the term of this patent is extended or adjusted under 35 U.S.C. 154(b) by 174 days.

(21) Appl. No.: 14/961,267

(22) Filed: Dec. 7, 2015

(65) Prior Publication Data

US 2016/0167271 A1   Jun. 16, 2016

(30) Foreign Application Priority Data

Dec. 10, 2014  (IT) .............................. TO2014A1022

(51) Int. Cl.
  *B29C 45/23*   (2006.01)
  *B29C 45/28*   (2006.01)

(52) U.S. Cl.
  CPC ........ *B29C 45/231* (2013.01); *B29C 45/2806* (2013.01); *B29C 2045/2824* (2013.01); *B29C 2045/2872* (2013.01)

(58) Field of Classification Search
  CPC .... B29C 2045/2824; B29C 2045/2872; B29C 45/231; B29C 45/2806
  See application file for complete search history.

(56) References Cited

U.S. PATENT DOCUMENTS 4,579,520 A * 4/1986 Gellert ................ B29C 45/2806
                                                          264/39
4,663,811 A * 5/1987 Gellert .................. B23P 15/007
                                                          29/527.6

(Continued)

FOREIGN PATENT DOCUMENTS

DE        19956215 C2    6/2001
DE    212013000080 U1   10/2014

OTHER PUBLICATIONS

"The new FLEXflow Accurate, stable and easy-to-use Servo-Driven valve gate for top quality. What You Have Always Dreamed of Only Better", Oct. 9, 2014 (Oct. 9, 2014), XP055205110, www.hrsflow.com Retreieved from the Internet: URL:http://www.hrsflow.com/DownLoadFileUrl.php?url=backend@@download@@file_upload@@allegato@@141009112811_1_flexflow_flyer_eng.pdf&nomefile=1_flexflow_flyer_eng.pdf [retrieved on Jul. 28, 2015] pp. 2-5.

(Continued)

*Primary Examiner* — Jill L Heitbrink
(74) *Attorney, Agent, or Firm* — RMCK Law Group, PLC

(57) ABSTRACT

An injector for a plastic material injection molding apparatus whose cylindrical pin-shaped valve that is axially displaceable between an advanced fully closed position and a retracted position of maximum opening, is provided in proximity to a distal end thereof with a reduced diameter cylindrical portion which delimits with the outlet end of the tip of the nozzle terminal an annular passage having a constant cross-section. When the pin valve is between fully closed and maximum opening positions, the reduced diameter cylindrical portion can be selectively positioned in intermediate positions so as to vary the axial extension of the annular passage to adjust the pressure drop of the injected plastic material.

2 Claims, 3 Drawing Sheets

(56) References Cited

U.S. PATENT DOCUMENTS

| | | | | |
|---|---|---|---|---|
| 2005/0100625 A1* | 5/2005 | Tooman | ............... | B29C 45/281 |
| | | | | 425/145 |
| 2008/0279979 A1* | 11/2008 | Fairy | .................. | B29C 45/2806 |
| | | | | 425/565 |
| 2012/0248644 A1* | 10/2012 | de Oliveira | | |
| | | Antunes | ............. | B29C 45/2703 |
| | | | | 264/40.5 |
| 2014/0210119 A1* | 7/2014 | Galati | ................ | B29C 45/2703 |
| | | | | 264/40.5 |

OTHER PUBLICATIONS

Italian Search Report and Written Opinion for Italian Application No. ITTO20141022 dated Aug. 13, 2015, 7 pages.

\* cited by examiner

INJECTOR FOR PLASTIC MATERIAL INJECTION MOLDING APPARATUS

CROSS REFERENCE TO RELATED APPLICATIONS

This application claims priority to Italian Patent Application No. TO2014A001022 filed on Dec. 10, 2014, the entire disclosure of which is incorporated herein by reference.

FIELD OF THE INVENTION

The present invention generally regards apparatus for the injection molding of plastic materials. More in particular, the invention regards an injector for molding apparatus thus made, of the type comprising a nozzle having a hollow terminal with an outlet end having a cylindrical inner surface, and a cylindrical pin-shaped valve axially displaceable along the nozzle between an advanced closed position and a retracted position for opening the injector.

STATE OF THE PRIOR ART

In the injectors of the type defined above, as described and illustrated for example in documents U.S. Pat. No. 6,960,073B2 and WO-2006/123237A1 on behalf of the Applicant, the pin valve has a distal end, for example tapered to form a frusto-conical or even cylindrical-shaped element, moveable by means of the outlet end of the nozzle terminal to close the injection passage ("gate") of a mold.

As regards the displacement of the pin valve of the injector between the closed and opening positions, the molding apparatus provides for an actuation system which currently provides for the use—instead of the conventional fluid actuators—of an electronically controlled electrical actuator which allows varying both the position and displacement speed of the pin valve with maximum accuracy. Examples of electrically operated injectors thus made are described and illustrated, for example, in the European patent EP-2679374 A1 on behalf of the Applicant.

SUMMARY OF THE INVENTION

The object of the present invention is to provide an injector of the type defined above, and more in particular whose pin valve is actuated by an electronically controlled electric motor, through which the flow of the plastic material injected between the aforementioned fully closed and fully opening positions can be controlled even more accurately during the injection.

According to the invention, this object is attained thanks to an injector of the type described in the pre-characterising part of claim 1, characterised in that the pin valve has, in proximity of said distal end, a reduced diameter cylindrical portion moveable through said outlet end of the nozzle terminal and delimiting an annular passage having a constant cross section therewith, and in that said electronically controlled actuator means are configured to axially position said reduced diameter cylindrical portion of the pin valve, when the latter is between fully closed and maximum opening positions, in intermediate positions so as to selectively vary the axial extension of said annular passage and thus adjust the pressure drop of the injected plastic material.

Thanks to this solution idea, the injector according to the invention allows obtaining an extremely accurate regulation of flow of plastic material during the injection, as a function of predetermined process parameters, to the advantage of the final quality of the molded articles.

The conformation of the reduced diameter cylindrical portion of the pin valve can be selected so as to optimise the aforementioned annular passage as a function of the type of plastic material to be injected, with particular reference to the viscosity thereof as the fundamental parameter for calculating the pressure drop. This guarantees considerable simplification in the injector designing, manufacturing and maintenance steps, due to the fact that pin valves, whose reduced diameter cylindrical portion has different dimensions to vary the radial width as well as axial extension of the aforementioned annular passage, can be associated to the relative nozzle as a function of the viscosity of the material to be injected, without having to modify other parts of the injector.

BRIEF DESCRIPTION OF THE DRAWINGS

The invention shall now be described in detail with reference to attached drawings, wherein.

DETAILED DESCRIPTION OF THE INVENTION

Figure 1:
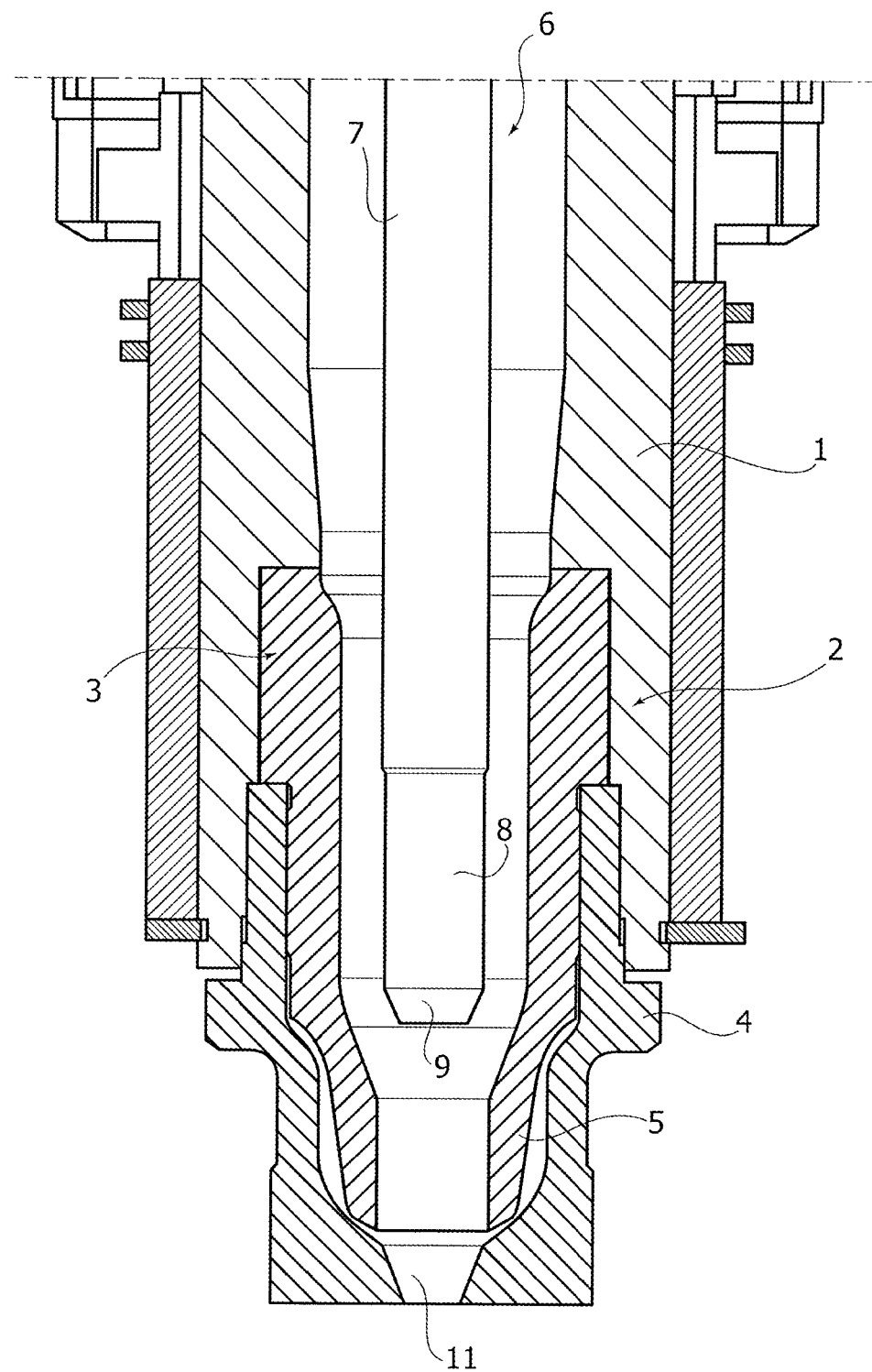
FIG. 1 is partial schematic view and in axial section showing an injector for plastic material injection molding apparatus according to the invention.
Figure 2:
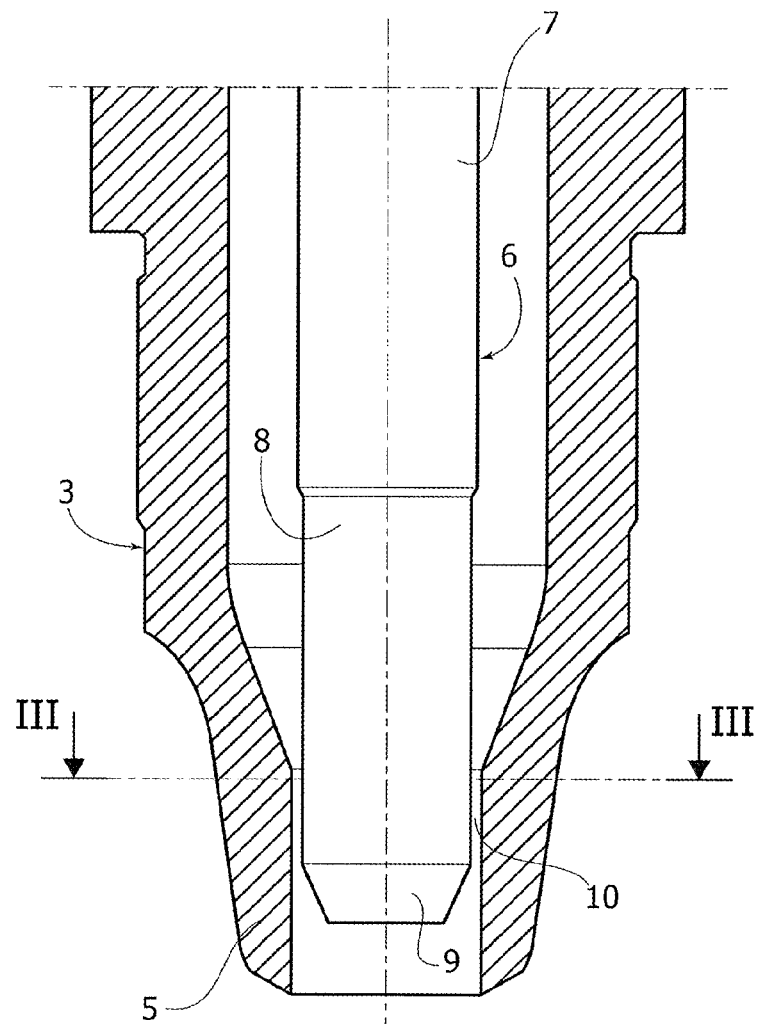
FIG. 2 shows an enlarged scale of the detail of FIG. 1.
Figure 3:
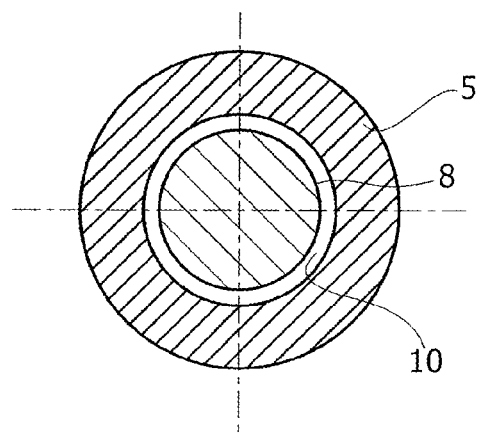
FIG. 3 is a cross sectional view according to a line III-III of FIG. 2.

With reference to FIGS. 1 to 3, the injector according to the invention comprises, in a generally conventional manner, a tubular nozzle body 1 connected to a dispenser of fluid plastic material to be injected and having a hollow nozzle terminal 2 intended to be coupled in an equally conventional manner, to the inlet passage ("gate") of a mold. In the case of the illustrated example, the nozzle terminal 2 comprises a tip 3 and a ring nut 4 for holding the tip 3 with respect to the nozzle body 1. The tip 3 has an outlet end 5 with a cylindrical inner surface.

A pin valve axially displaceable along the nozzle body 1 through an actuator, in particularly constituted by an electric motor for example of the rotary type described and illustrated in the previously mentioned document EP-2679374 A1 A is indicated with 6. The electric motor is in turn actuated by an electronically controlled unit, neither illustrated nor described in detail in that generally known to a man skilled in the art, configured to operate according to the principles of the invention.

The pin valve 6 has a cylindrical body 7 having an end portion 8, also cylindrical-shaped, but with reduced diameter i.e. smaller than the diameter of the body 7, terminating with a distal end 9, typically frusto-conical or cylindrical-shaped, adapted to cooperate with a complimentarily-shaped injection passage 11 which, in the case of the illustrated example, is formed in the ring nut (4).

The pin valve 6 is axially displaceable, by means of the electric motor and the relative aforementioned electronic control, between an advanced fully closed position of the injector, in which the distal end thereof 9 closes the injection passage 11, and a retracted position of maximum opening, represented in FIG. 1, to allow the flow of the plastic material, supplied into the nozzle body 1, through the injection passage 11. The electronic control allows varying and adjusting both the axial position and the displacement speed of the pin valve 6 between such fully closed and maximum opening position, so as to be positioned at any intermediate position determined as a function of process parameters. FIG. 2 represents one of such intermediate positions of partial opening of the flow of the injected plastic material: as observable, between the end with cylindrical inner surface 5 of the tip 3 and the cylindrical portion 8 of the pin valve 6 there is defined an annular passage 10 having a constant cross section, whose radial dimension shall be selected by associating pin valves 6 provided with cylindrical portions 8 with different diameters to the nozzle 1 as a function of the type of material to be injected, with particular reference to the viscosity thereof.

The axial extension of the annular passage 10 is in turn variable or adjustable by means of the electronic system for controlling the actuation motor of the pin valve 6, thus so as to consequently regulate the flow of the injected material in an extremely precise and fine manner. This due to the increase of pressure drop of the plastic material exiting from the injector, and thus the pressure reduction of the plastic material introduced into the mold, upon the increase of the axial extension of the annular passage.

Figure 4:
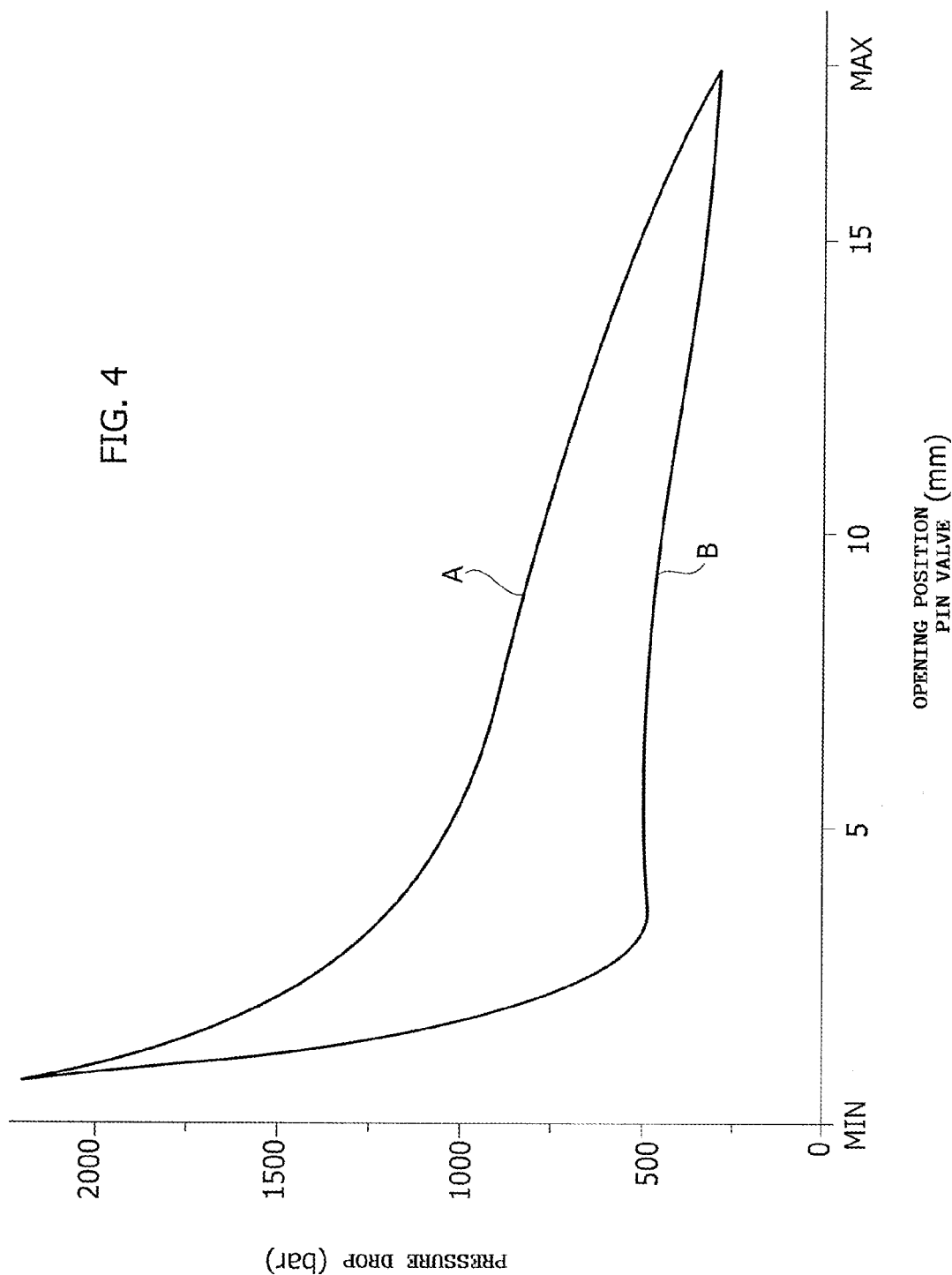
FIG. 4 is a chart showing the variation of the pressure drop or loss as a function of the opening position of the pin valve of the injector according to the invention, compared to an injector according to the prior art.

The chart of FIG. 4 shows the pressure drop trend as a function of the opening position of the pin valve in case of the injection according to the invention (line A) with respect to the trend (line B) of an injector of the conventional type, in which the annular passage section defined between the tip and distal end of the pin valve has a radial width that is not constant but decreasing as the pin valve nears the fully closed position. As observable, line A is considerably more regular and gradual.

It should be observed that the configuration of the cylindrical portion 8 of the pin valve 6, in terms of both radial and axial dimensions, may be designed as a function of the type of plastic material to be injected. This advantageously allows attaining a considerable simplification during the adaptation of the injector, due to the fact that to the nozzle 1 there can be associated pin valves 6 that are different and such to modify the geometry of the annular passage 10 as a function of the characteristics of the plastic material to be injected without requiring the modification of the tip 3 or the nozzle terminal 2.

Obviously, the construction details and the embodiments may widely vary with respect to what has been described and illustrated, without departing from the scope of protection of the invention as described in the claims that follow.

The invention claimed is:

1. An injector for a plastic material injection molding apparatus, comprising a nozzle having a hollow terminal having a tip with an outlet end having a cylindrical inner surface, a cylindrical pin-shaped valve axially displaceable along the nozzle and having a distal end, and an electronically controlled actuator arrangement to operate displacement of said pin valve between an advanced fully closed position of the injector, and a retracted position of maximum opening, wherein the pin valve is provided in proximity to said distal end with a reduced diameter cylindrical portion movable through said outlet end of the tip of the nozzle and delimiting therewith an annular passage having a constant cross section, and in that said electronically controlled actuator arrangement is configured to axially position said reduced diameter cylindrical portion of the pin valve, when the latter is set between said fully closed and said maximum opening positions, at intermediate positions so as to selectively vary an axial extension of said annular passage and consequently adjust a pressure drop of the injected plastic material.

2. The injector according to claim 1, wherein different valve pins can be selectively associated to the nozzle, whose reduced diameter cylindrical portion has different diameters so as to vary a radial size of said annular passage as a function of viscosity of the plastic material to be injected without modifying the nozzle.

* * * * *